Patented Aug. 14, 1923.

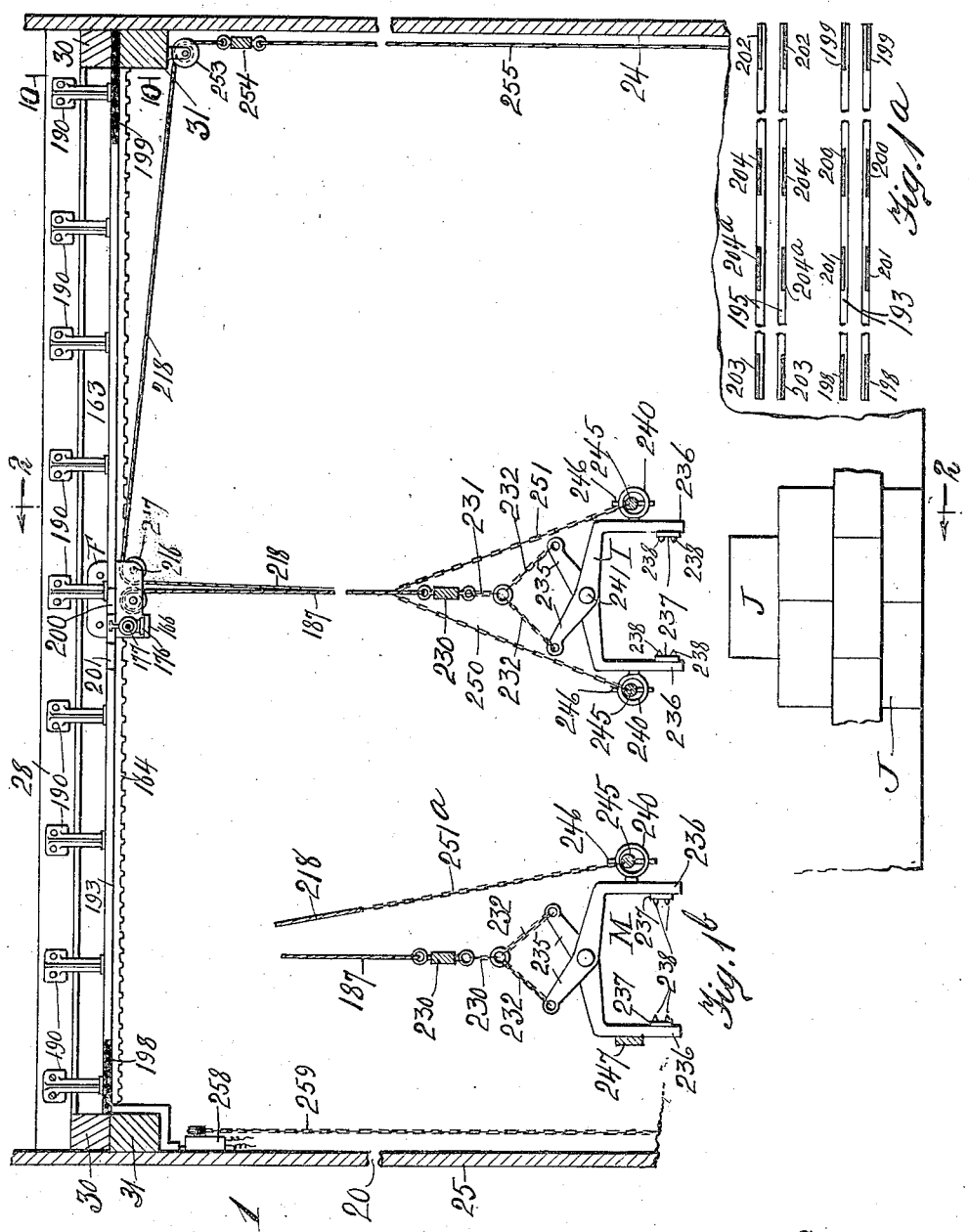

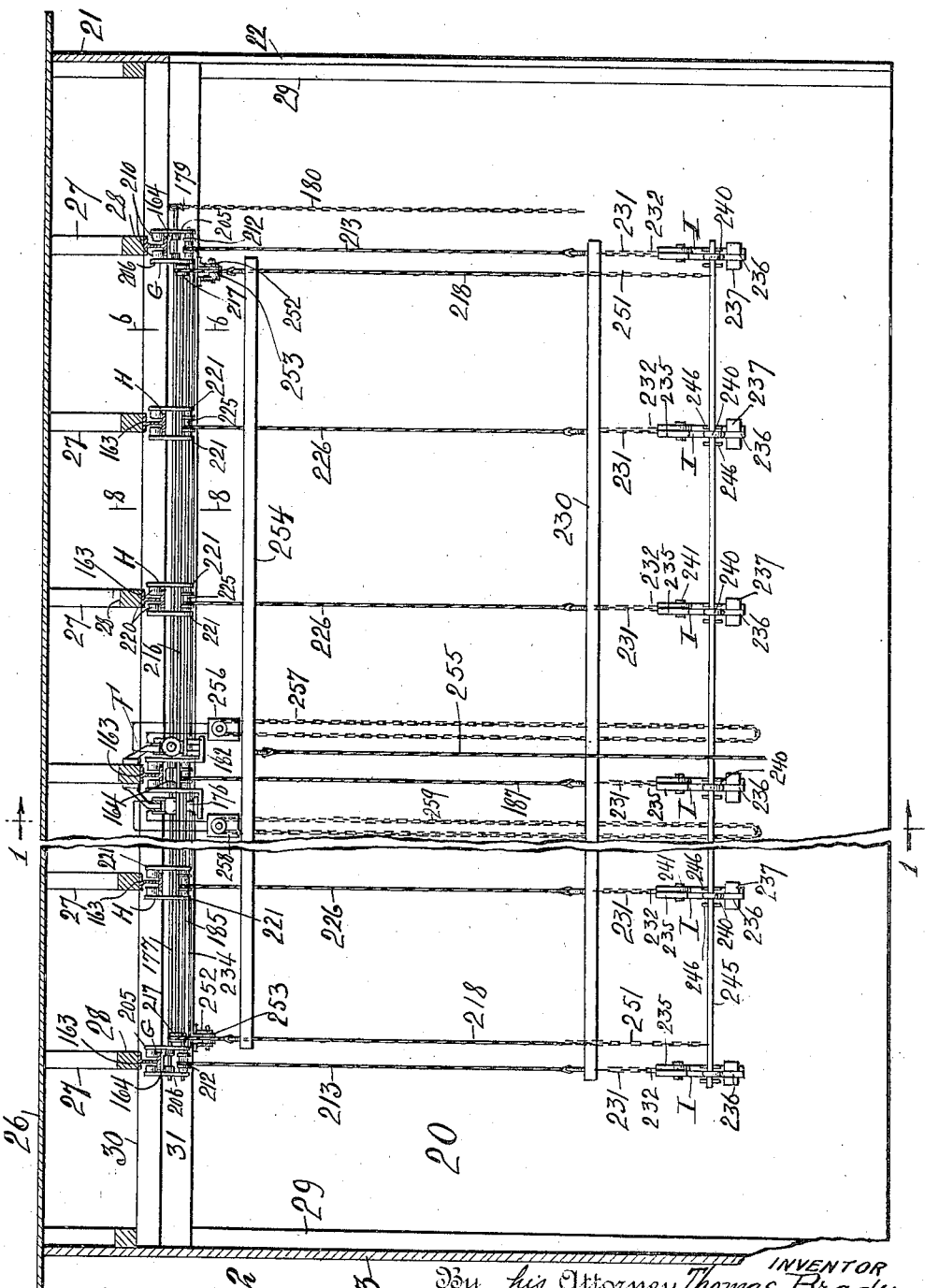

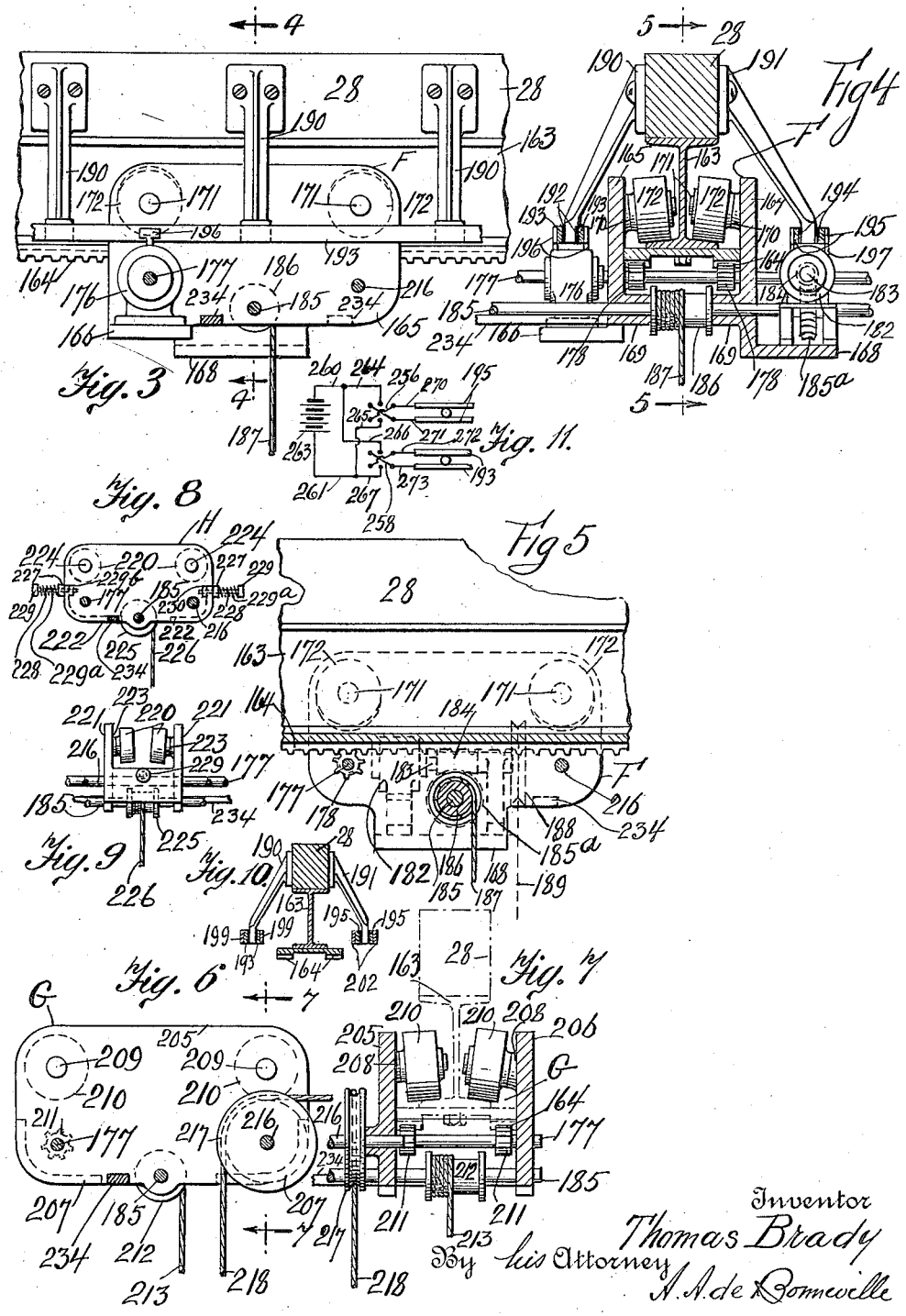

1,465,155

UNITED STATES PATENT OFFICE.

THOMAS BRADY, OF BAYONNE, NEW JERSEY.

CONVEYER APPARATUS.

Application filed July 21, 1920. Serial No. 397,879.

*To all whom it may concern:*

Be it known that I, THOMAS BRADY, citizen of the United States, and resident of Bayonne, in the county of Hudson and State of New Jersey, have invented certain new and useful Improvements in Conveyer Apparatus, of which the following is a specification.

This invention relates to a conveyer apparatus, by means of which cakes of ice and the like can be easily located in various places.

The object of the invention is the production of means to simultaneously handle cakes of ice or other objects of various sizes, that is to say to either hoist or lower them and convey them to different places.

The organization of the invention consists essentially of trolleys supported on tracks, with hoisting ropes extending from the trolleys and tongs suspended from said ropes. Releasing means are connected to the tongs by means of which they can be simultaneously released from the cakes of ice. A motor is provided to move the trolleys simultaneously on the tracks and a motor is installed on one of the trolleys to simultaneously operate the hoisting means of all the trolleys.

Fig. 1 represents a front view of the conveyer apparatus and a section of the ice house on the line 1, 1, of Fig. 2; Fig. 1ª represents a top plan view of some details of Fig. 1; Fig. 1ᵇ represents an elevation of a modification of some of the parts shown in Fig. 1; Fig. 2 shows a side view of the conveyer apparatus and a section on the line, 2, 2 of Fig. 1; Fig. 3 is an enlarged fragmentary portion of Fig. 1 with the hoisting and conveying trolley; Fig. 4 represents a partial section of Fig. 3 on the line 4, 4; Fig. 5 shows a section of Fig. 4 on the line 5, 5; Fig. 6 shows a side elevation of an end hoisting and conveying trolley and an enlarged partial section of Fig. 2 on the line 6, 6; Fig. 7 is a section of Fig. 6 on the line 7, 7; Fig. 8 represents an enlarged side view of an intermediate hoisting trolley and a partial section of Fig. 1 on the line 8, 8; Fig. 9 represents an end view of Fig. 8; Fig. 10 represents a section of Fig. 1 on the line 10, 10 and Fig. 11 represents a wiring diagram.

Referring to the accompanying drawings, an ice house for the storage of ice is indicated in its entirety by the numerals 20. The house consists of the front wall 21 with the opening 22, the rear wall 23, the side walls 24, 25, the roof 26 supported on roof trusses 27 with the horizontal or bottom members 28. Posts 29 support the longitudinal side girders 30, 31 and the former in turn support the members 28 of the roof trusses 27.

To the lower faces of the horizontal or bottom members 28 of the trusses are fastened the I beams or tracks 163 and to the lower face of some of the latter are fastened the pairs of racks 164.

A main hoisting and conveying trolley is indicated in its entirety by the letter F, and comprises a housing with the vertical member 165 having the foot 166 and the vertical member 167 having the foot 168. Journal bearings 169 extend from the inner faces of the vertical members 165 and 167 and bosses 170 are formed with said vertical members.

Journal pins 171 extend from the bosses 170 and have journaled thereon the rollers 172. A conveying electric motor 176 is supported upon the foot 166 and its armature shaft 177 extends through the vertical members 165 and 167 and through all other trolleys to be described. A pair of pinions 178 are fastened to the said shaft 177 and mesh with the racks 164. A sprocket chain wheel 179 with the hand chain 180 is fastened to the shaft 177. A hoisting motor 182 is fastened to and supported upon the foot 168, and its armature shaft 183 has fastened thereto a worm 184. A hoisting shaft 185 is journaled in the bearings 169 and extends through all the other trolleys to be described. A worm wheel 185ª is fastened to the shaft 185 and meshes with the worm 184. A hoisting drum 186 is fastened to the shaft 185, and a hoisting rope 187 has one end fastened to the drum 186. A sprocket chain wheel 188 with the hand chain 189 is fastened to the shaft 183. Brackets 190 and 191 have their upper ends fastened to the bottom member 28 of the roof truss. Pads 192 of insulating material are fastened to the bottom ends of the brackets 190. Conductor bars 193 are fastened to the lower ends of the brackets 190 and bear against the pads 192. Pads 194 of insulating material are fastened to the lower ends of the brackets 191 and conductor bars 195 bear against the pads 194. Wipers 196 extend from the electric motor 176 and bear against the conductor bars 193 and wipers 197 extend from the electric motor 182 and bear against the bars 195. At the opposite ends of the conductor bars 193 are located two pairs of similar insulating blocks 198 and 199 and adjacent to the middle portions of the bars 193 are located two pairs of insulating blocks 200 and 201. At the opposite ends of the conductor bars 195 are located the similar insulating blocks 202 and 203 and adjacent to the middle portions of the bars 195 are located the similar insulating blocks 204 and 204ª.

A pair of end hoisting and conveying trolleys each indicated in its entirety by the letter G are located at the ends of the shafts 177 and 185 which are each journaled in said end trolleys. Each of the trolleys G comprises a housing with the vertical side walls 205 and 206, which are connected by the connecting members 207. Bosses 208 are formed with the walls 205 and 206 and which have extending therefrom pins 209 that have journaled thereon the rollers 210. The shaft 177 has fastened thereto the pinions 211 that mesh with the rack 164. A hoisting drum 212 is fastened to the shaft 185. A hoisting rope 213 has one end fastened to the drum 212. A shaft 216 is journaled in all the trolleys and has fastened thereto adjacent to the trolleys G the sheaves 217. Adjusting ropes 218 extend over the sheaves 217.

Intermediate hoisting trolleys designated in their entirety by the letter H, each comprises the housing consisting of the vertical walls 221 that are connected by the connecting members 222. Bosses 223 extend from the inner faces of the walls 221 and carry the journal pins 224. Rollers 220 are journaled on the pins 224. All the shafts 177, 185 and 216 are journaled in the vertical walls 221 of the trolleys H and extend through the same. A hoisting drum 225 is located between the vertical walls of each trolley H and fastened to the shaft 185. A hoisting rope 226 has one end fastened to each of the drums 225. On the opposite ends of some of the trolleys H are supported spring bumpers.

The bumpers comprise lugs 227 which are cast with the connecting members 222. Bolts 228 with the heads 229 are supported in openings in the connecting members 222 and lugs 227. Springs 229ª are supported on the bolts 228 between the lugs 227 and the heads 229. Nuts 230 are in threaded engagement with the bolts 228.

The bumpers contact with the girders 31 when the trolleys accidentally run to the sides of the ice house 20. Connecting bars 234 connect the different trolleys. The hoisting ropes 187, 213 and 226 at their lower ends are connected to the hoisting bar 230. Chains 231 connect the hoisting bar 230 and the pairs of chains 232.

Ice tongs I each comprise a pair of jaws with the upper member 235 and the lower member 236. A gripping pad 237 with the gripping pins 238 is connected to each member 236, and an eyelet 240 extends from the outside face of the accompanying member 236. The chains 232 are connected to the upper members 235. The jaws of the tongs are pivoted to each other by means of the pivot 241. Connecting bars 245 extend through the eyelets 240 and pins 246 extend through the bars 245 on opposite sides of the eyelets.

Chains with the members 250 and 251 extend from the opposite ends of the bars 245 and are connected to the ropes 218. Journal brackets 252 extend from the girders 31 and have journaled therein the guide sheaves 253. The ropes 218 extend over the guide sheaves 253 and are fastened to the releasing bar 254. A releasing rope 255 has one end fastened to the connecting bar 254. A reversing switch 256 with the operating chain 257 is secured to the wall 25, and coacts with the hoisting motor 182. A reversing switch 258 with the hand chain 259 and coacting with the conveyer motor 176 is secured to the wall 25. A pair of main line wires 260, 261 lead from a source of electricity 263 and have connected thereto the branch wires 264, 265 for the reversing switch 256, and the branch wires 266, 267 lead from said main line wires to the reversing switch 258. Wires 270, 271 connect the switch 256 with the conductor bars 195 and wires 272, 273 connect the reversing switch 258 with the conductor bars 193.

To operate the apparatus, the main hoisting and conveying trolley F is located to bring the ice tongs I over the cakes of ice J to be handled. The operator next pulls the disengaging rope 255 so that the lower members 236 of the tongs will straddle the cakes J. When the rope 255 is released the pins 238 will engage the side faces of the cakes J.

The operator now pulls the hand chain 257 of the switch 256 to start hoisting motor 182 in its hoisting direction and the hoisting drums 186, 212 and 225 turn, and the hoisting bar 230 rises with the tongs I and the cakes of ice J. At the same time the releasing bar 254 lowers. The motor 182 is next stopped and the conveying motor 176 is started, to move the trolleys to one of the side walls of the house by means of the hand chain 259 and reversing switch 258. By means of the trolleys with the tongs I, the cakes J of ice are moved as desired. The chain 257 is now pulled to reverse the rotations in hoisting motor 182 and the cakes of ice J are lowered in place. The operator next releases the lower members 236 of the tongs I from the cakes of ice by pulling the releasing rope 255. To take ice out of the building the tongs I are located over the cakes of ice J where they have been deposited and locates them where desired.

The insulating blocks 199 and 202 stop the conveying motor 176 and prevent the trolleys contacting with wall 24 of the building 20 and the insulating blocks 198 and 203 in a similar manner prevent the trolleys contacting with the wall 25 of said building. When the apparatus is used to transport ice toward the side 24 of the building 20, the insulating blocks 200 and 204 are removed, and conductor bars are substituted in their places and the insulating blocks 201 and 204ª prevent the apparatus from running beyond the center of the building. In case the apparatus is used between the center of the building and the wall 25, the insulating blocks 201 and 204ª are removed and conductor bars substituted. By this means the trolleys are prevented from running beyond the central portion of the buildings.

In case the cakes of ice are to be moved from one side of the building and conveyed to the other side of the building all the intermediate insulating blocks 200, 201, 204 and 204ª are removed and conductor blocks substituted in their places.

By means of the sprocket chain wheel 179 and chain 180 the trolleys F, G and H may be manually moved on their supporting I beams 163 and by means of the sprocket chain wheel 188 and hand chain 189 the hoisting chains of said trolleys may be raised or lowered.

In the modification represented in Fig. 1ᵇ tongs M are substituted for the tongs I and a plurality of these tongs are used simultaneously as described for the tongs I. The tongs M each comprise jaws with the members 235, 236, gripping pads 237 with the gripping pins 238, eyelets 240 on one of each member 236, with the connecting bar 245 and pins 246 as already described. The other members 236 of each pair of jaws are rigidly connected by the connecting bar 247. Chains 232 connect the members 235 and chains 231 connect the chains 232 with the hoisting bar 230. Hoisting ropes 187 extend from the bar 230. Adjusting ropes 218 are connected to the chains 251ª which in turn are connected to the bar 245.

The operation of this modification is similar to that described for the tongs I, with the exception that only one of each pair of jaws is raised by the rope 218 and its appurtenances when the tongs are opened to release the cakes of ice.

It will be noted that the connecting bars 245 are smaller in diameter than the inside diameters of the eyelets 240, by virtue of which sufficient clearance space is provided between said connecting bars and eyelets to insure the proper operation of the tongs I and M.

When the cakes of ice vary in width and the tongs I or M are lowered in place, the operator pulls the releasing rope 255 to spread the lower members 236 of the tongs to clear all the cakes of ice. When the rope 255 is subsequently released the gripping pins 238 will all engage their accompanying cakes of ice, by reason of the clearance between the eyelets 240 and the connecting bars 245.

Having described my invention what I desire to secure by Letters Patent and claim is:

1. The combination of a plurality of tongs, each comprising a pair of swinging jaws, each jaw having a member on opposite sides of its swinging axis, means to simultaneously actuate the members of the jaws on one side of the axes and means to simultaneously actuate the members on the opposite side of said axes.

2. The combination of a plurality of tongs comprising each a pair of swinging jaws, each jaw having a pair of members, one of said members on one side of its swinging axis and the other member on the other side, means to simultaneously actuate the members on one side of their axes and means to actuate the members on the other side of their axes, the latter means permitting its coacting members to swing different distances apart.

3. The combination of a plurality of tongs comprising each a pair of swinging jaws, each jaw having a pair of members, one of said members on one side of its swinging axis and the other member on the other side of its swinging axis, means to simultaneously actuate the members on one side of their axes, appurtenances connected to the members on the other side of their axes to engage objects to be handled, means to actuate one series of the members having the said appurtenances to engage said objects, the latter means actuating through clearance spaces to permit the members of each pair of jaws to be located different distances apart and means to maintain the tongs laterally, in a direction parallel to a line extending through their swinging axes, the same distance apart.

4. The combination of a plurality of tongs comprising each a pair of swinging jaws, each jaw having a pair of members, one of said members on one side of its swinging axis and the other member on the other side of its swinging axis, means to simultaneously actuate the members on one side of their axes, appurtenances connected to the members on the other side of their axes to engage objects to be handled, means to simultaneously actuate all the members having said appurtenances to engage said objects, the latter means actuating with clearance spaces to permit the members with said appurtenances to be located different distances apart.

5. The combination of a plurality of tongs comprising each a pair of swinging jaws, each jaw having a pair of members, one of said members on one side of its swinging axis and the other member on the other side of its swinging axis, means to simultaneously actuate the members on one side of their axes, gripping appurtenances connected to the members of the other side of their axes, an eyelet on each of the members having the gripping appurtenances and a connecting bar extending through the eyelets, the said bar and eyelets having clearance spaces between them and means to move the bar.

6. In a conveyer apparatus the combination of a plurality of tongs, each of said tongs comprising jaws with an upper member and a lower member, chains connected to the upper members, eyelets connected to the lower members, a connecting bar extending through the eyelets of one series of lower members, a connecting bar extending through the eyelets of the other series of lower members and ropes connected to the ends of the connecting bars.

7. In a conveyer apparatus the combination of a plurality of tongs, each of said tongs comprising jaws each with an upper member and a lower member, chains connecting each pair of upper members, a hoisting bar connected to said chains, hoisting ropes connected to said hoisting bar, an eyelet connected to the lower member of each jaw of the tongs, a connecting bar extending through the eyelets of the jaws on one side of the tongs, a connecting bar extending through the eyelets of the jaws on the other side of the tongs, chains connecting the adjacent ends of the pair of connecting bars, ropes with one end of each connected to the latter chains, a releasing bar connected to the other ends of the ropes and a releasing rope with one end connected to the releasing bar.

8. In a conveyer apparatus the combination of a plurality of tongs, each of said tongs comprising a pair of jaws with an upper member and a lower member, chains connected to the upper members a connecting bar rigidly connected to one series of the lower members, eyelets connected to the other series of lower members, a connecting bar extending through said eyelets and ropes to actuate the said connecting bar in said eyelets and thereby swinging said lower members having said eyelets connected thereto.

9. In an apparatus of the character described the combination of a plurality of tongs, means to simultaneously grip cakes of material of different sizes with the tongs, means to vertically move all the tongs, means to simultaneously release all the tongs from the cakes of material and means to simultaneously move all the tongs horizontally.

Signed at Bayonne, in the county of Hudson and State of New Jersey, this 16th day of July, A. D. 1920.

THOMAS BRADY.